`US005316045A`

United States Patent [19]

Taylor

[11] Patent Number: 5,316,045
[45] Date of Patent: May 31, 1994

[54] STORM DRAINAGE CONDUIT PLUG

[76] Inventor: James R. Taylor, 6875 Myakka Valley Trail, Sarasota, Fla. 34241

[21] Appl. No.: 31,609
[22] Filed: Mar. 15, 1993
[51] Int. Cl.[5] ............................................. F16L 55/10
[52] U.S. Cl. ................................................... 138/89
[58] Field of Search ...................... 138/89, 90, 92, 94; 220/241, 260, 356, 357, 358, 212.5

[56] References Cited

U.S. PATENT DOCUMENTS

| 798,507 | 8/1905 | Hally | 138/89 |
|---|---|---|---|
| 824,896 | 7/1906 | Willis | 138/89 |
| 1,137,466 | 4/1915 | Dillon | 138/89 |
| 1,435,008 | 11/1922 | Joy | 138/89 |
| 1,491,325 | 4/1924 | Thomas | 138/89 |
| 2,506,362 | 5/1950 | Hofmann | 138/89 |
| 2,709,046 | 5/1955 | Hyde | 138/92 |
| 3,525,366 | 8/1970 | De Frees | 138/89 |
| 3,675,685 | 7/1972 | Potter | 220/241 |
| 3,780,773 | 12/1973 | Haugen | 138/89 |
| 3,807,457 | 4/1974 | Logsdon | 138/89 |

Primary Examiner—James E. Bryant, III
Attorney, Agent, or Firm—Charles J. Prescott

[57] ABSTRACT

A temporary reusable storm drainage conduit plug sized to slidably fit into either exposed end (male or female end) of a length of tubular conduit situated within the ground. The device in use prevents dirt and debris from entering the open end of conduit already in place during storm drainage construction and is easily removable when the construction is ready to proceed further.

4 Claims, 1 Drawing Sheet

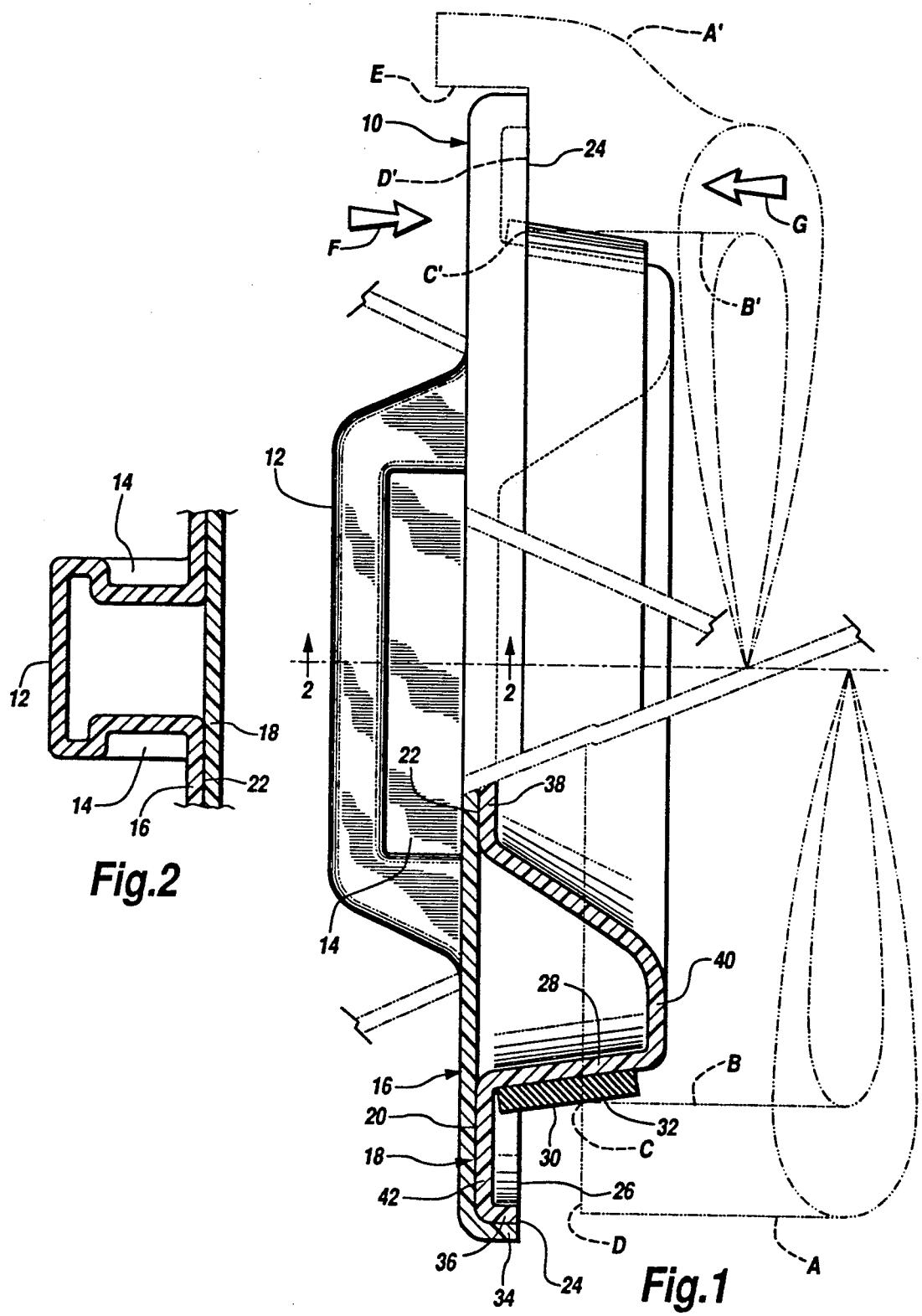

STORM DRAINAGE CONDUIT PLUG

BACKGROUND OF THE INVENTION

This invention is generally directed to means for sealing the end of pipes, and more particularly to a temporary reusable storm drainage conduit plug removably installable for preventing debris from entering these conduit systems when in place during construction.

DESCRIPTION OF PRIOR ART

During storm drainage system or sanitary sewer construction, sections of preformed reinforced concrete drainage conduit are laid in place and sealed end to end to ultimately form the completed drainage system. These lengths of conduit are typically fabricated of concrete and include end configurations which facilitate easy mating with the next successive conduit and are permanently sealable at or after installation.

At a point during the construction when the laying of conduit into a suitable trench and prepared bed must be temporarily interrupted, the open end of the last installed conduit is subject to being filled with dirt, debris and mud slurry. This may occur as a result of rain water filling the prepared trench or in situations where the conduit in place must be temporarily covered to allow interrupted traffic pattern to continue.

Additionally, when manholes of storm drainage systems are installed, the horizontal opening which, when completed, will receive a heavy steel manhole cover, or the lower manhole base thereof, is otherwise temporarily open and subject to a worker, debris or tools falling thereinto.

A conventional method of temporarily covering the ends of these conduits and manholes is to place a sheet of plywood over the opening. In covering a manhole having a horizontal opening, such a technique, although inconvenient, is somewhat practical despite the fact that the plywood is not cut to size. However, in situations where the conduit end will be temporarily buried, the contractor must anticipate the stabilizing of a larger sheet of plywood while it is temporarily covered with earth along with the conduit. Even where cut to size, the plywood is hard to handle and will rapidly deteriorate or be damaged.

Where the conduit ends are not so covered, sufficient debris has been known to enter the portion of the drainage system already in place in sufficient quantities so as to functionally obstruct future water flow, requiring its removal prior to continuing with the construction of the remaining conduit system.

Although my previous invention as set forth in Ser. No. 07/750,817 filed Aug. 27, 1991 was an improvement, that device was structured to be fitted into only the bell-shaped or female end of the drainage conduit. It has been since determined that, due to variations in the wall thickness of drainage conduits between manufacturer's nominally sized plugs, e.g. 12", 15", etc., will not fit into all male conduit ends.

BRIEF SUMMARY OF THE INVENTION

This invention is directed to a temporary reusable storm drainage conduit plug sized to slidably fit into either exposed end (male or female end) of a length of tubular conduit situated within the ground. The device in use prevents dirt and debris from entering the open end of conduit already in place during storm drainage construction and is easily removable when the construction is ready to proceed further.

It is therefore an object of this invention to provide an improved temporary storm drainage conduit plug which, when installed, will prevent debris, dirt and other objects from inadvertently entering the exposed end of a storm drainage conduit system during construction.

It is another object to provide the above invention as a highly durable and reusable device which is economical to manufacture and impervious to elements in the intended surroundings.

It is yet another object to provide the above invention utilizing vacuum forming manufacturing techniques to add strength and hermetic sealing against air and moisture from entering into the interior of the device and possible warpage and deterioration and moisture accumulation associated therewith.

It is yet another object of this invention to provide a temporary storm drainage conduit plug which, in each nominal size (e.g. 12", 15", 18", etc.) will sealably fit into either straight or belled end (male or female end) of any corresponding nominally sized conduit.

In accordance with these and other objects which will become apparent hereinafter, the instant invention will now be described with reference to the accompanying drawings.

BRIEF DESCRIPTION OF THE DRAWINGS

FIG. 1 is a side elevation broken partial section view of the invention showing either the straight (male) or the bell-shaped (female) end of a conventional storm drainage conduit in phantom in a partially or fully seated position, respectively.

FIG. 2 is a broken section view in the direction of arrows 2—2 in FIG. 1.

DETAILED DESCRIPTION OF THE INVENTION

Referring now to the drawings, the invention is shown generally at numeral 10 positioned within either a straight (male) end A or a belled or enlarged (female) end A' of a conventional circular reinforced concrete drainage conduit, both shown in phantom. The inside diameter E of the belled end A' is circular and sized to receive the corresponding straight or male end A of the next conduit section in sequence.

The invention 10 is manufactured of mating inner and outer thin molded panels 18 and 16, respectively, each formed of a sheet of ABS plastic (approximately ⅛ inch thick). Each of these panels 16 and 18 is preferably vacuum formed; however, other manufacturing processes such as injection molding may also be employed.

The outer panel 16 is generally planar in shape typically having a circular outer perimeter and having a centrally positioned molded handle 12 orthogonally extending and with opposing recesses 14 for easy grasping. The perimeter of the outer panel 16 includes a contoured lip 34 which terminates facing generally orthogonal to the plane of outer panel 16 and in the opposite direction from handle 12 as shown.

The inner panel 18 is also vacuum formed so as to include a generally flat circular central portion 38 which mates and is bonded in place against a corresponding central portion of the outer panel 16 along surface 22. Positioned immediately around the flat central portion 38 is a raised portion 40 which strengthens the inner panel 18 and also serves to define an outer generally cylindrical, but slightly tapered sealing surface 28. This sealing surface 28 is somewhat smaller, but concentric with the outer perimeter of the device 10.

The inner panel 18 also includes a planar ring-shaped flange 42 which outwardly extends radially from the raised portion 40 to terminate in a lip 36 which matably engages, along with flange 42, against the corresponding surface and lip 34 of the outer panel 16 as shown. These lips 34 and 36 are bonded together and hermetically sealed, along with surface 20, so as to define a stop surface for engagement against the end of the drainage conduit when fully installed.

The inner and outer panels 18 and 16, respectively, fully bonded together along surface 20 and 22, define an interior volume which, by virtue of the bonded connection along surface 20 is hermetically sealed from the environment, including being impervious to water and moisture which are typically found in a drainage system installation.

The preferred embodiment 10 also includes a resilient band 30 formed of elastomeric material and sized to fit snugly around the tapered sealing surface 32 and be bonded in place by appropriate adhesive material. This resilient band 30 serves to provide a tighter fit of the device both for sealing and retention, into either end B or B' of the drainage conduit. The device 10 is shown partially installed onto the male end A wherein inner edge C is just in contact with the elastomeric band 30. By forcing the device in the direction of arrow F, the elastomeric band 30 is compressed so that the stop surface 24 comes directly in contact against the end face D or D' of the drainage conduit. This is shown in phantom with respect to the female end A' wherein that end of the drainage conduit in phantom has been moved in the direction of arrow G, with inner edge C' being depressed into the resilient band 30, to be fully engaged around the elastomeric band 30 and against stop surface 24.

Although the storm drainage conduit is depicted as having circular openings into which a circular embodiment of the device is to be protectively installed on a temporary basis, the invention is also intended to be provided in oval, or elliptical or other planar configurations so as to be protectively installed into the ends of that configuration of reinforced concrete conduit as well.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A reusable storm drainage conduit plug for temporarily closing an open end of a drainage conduit comprising:
    a molded plastic outer panel defining an outer planar perimeter of said plug and having a centrally positioned molded gripping handle;
    a molded plastic inner panel coextensive with said outer panel and connected directly against an interior surface of said outer panel;
    said inner panel including an integral annular-shaped raised portion defining an outer sealing surface concentric with and smaller than said outer perimeter and extending generally orthogonally from said inner panel;
    said sealing surface sized for insertion into, and mating alignment within, the open end of an in situ drainage conduit;
    said inner and outer panels having a generally planar ring-shaped outer flange extending radially from said sealing surface to said outer perimeter;
    said plug structured to remain undeformed within the end of the in situ drainage conduit in response to being covered with earth, said plug preventing earth from accumulating within the drainage conduit.

2. A reusable storm drainage conduit plug as set forth in claim 1, wherein:
    said inner and outer panels vacuum formed and sealingly overlapped at a perimeter of said flange to form a lip of said flange, said lip being disposed generally orthogonally to said inner panel in the direction of said raised annular-shaped portion;
    said inner and outer panels defining an interior volume which is hermetically sealed from air and moisture.

3. A reusable storm drainage conduit plug as set forth in claim 1, further comprising:
    a resilient band formed of elastomeric material connected to and extending around said sealing surface.

4. A reusable storm drainage conduit plug as set forth in claim 3, wherein:
    said sealing surface is tapered to accommodate minor variations in drainage conduit interior diameter.

* * * * *